United States Patent Office 3,256,322
Patented June 14, 1966

3,256,322
ANIONIC EMULSIFYING AGENT
Oscar L. Scherr, Los Angeles, Calif., assignor to Emery Industries, Inc., Cincinnati, Ohio, a corporation of Ohio
No Drawing. Filed Oct. 2, 1963, Ser. No. 313,198
3 Claims. (Cl. 260—501)

This application is a continuation-in-part of co-pending application, Serial No. 824,925, filed July 6, 1959 and now abandoned.

This invention relates to a toxicant composition adapted to be mixed with water by the agricultural user to form a stable emulsion adapted for spray usage. More particularly the invention brings to the composition a new emulsifying agent capable of giving instant dispersion or "bloom" when mixed with water of any degree of hardness, the resulting emulsion being a highly stable one.

The present practice of destroying or controlling insect, fungus, weed and other agricultural pest invasions on our agricultural areas by large scale spraying of the newer organic toxicants such as DDT, aldrin, dieldrin, toxaphene, malathion, parathion, esters of 2,4,5-dichloro phenoxyacetic acid and many others requires having concentrated solutions of the toxicants in suitable organic solvents such as xylene, kerosene, aromatic oils or isopropanol, together with an emulsifier of such power that when the toxicant concentrate is mixed in diluted solution with available water of whatever hardness, a stable emulsion is formed in which the toxicant solvent solution is finely dispersed. The resulting emulsion is a highly stable one and it may thus be sprayed over large areas without separating in the spraying rig tank even when held therein for many hours before being used.

Until recently many of the available emulsifiers for this purpose were blends of polyoxyethylated sorbitan esters, polyethylene glycol esters, glycol esters and petroleum sulfonates. However, emulsifiers of this type did not give the instant aqueous dispersion, known as "bloom," when the toxicant solvent concentrate was mixed with water. Some emulsifiers work better in hard water containing 300 to 600 p.p.m. of $CaCO_3$; others were better in waters of less hardness, 50 to 125 p.p.m. The operators of insecticidal spraying companies were forced to stock many assorted emulsifiers for use with the various toxicants required. The present invention solves this problem by providing a novel anionic emulsifier which affords the most desirable bloom characteristics no matter whether the water employed be hard or relatively soft, this emulsifier normally being employed in conjunction with one or more nonionic emulsifiers in order to develop the optimum hydrophilic-hydrophobic balance in the composition.

More recently, U.S. Patent No. 2,696,453 introduced the use of calcium dodecylbenzene sulfonate as a substitute for the petroleum sulfonates in blends of emulsifiers containing nonionic polyoxyethylene ethers and esters. While this innovation gives finer dispersion and instantaneous "bloom" of the toxicant emulsions, the problem of producing emulsifiers that are effective over a wide range of water hardness is still not completely solved. Moreover, the inherent presence of water in the metal sulfonate (formed as an incident of the neutralization of the sulfonic acid portion of the molecule with the calcium reactant) causes decomposition of certain toxicants (e.g., tetraethyl pyrophosphate) as well as otherwise impairing the utility of the composition.

Applicant has found that anionic emulsifying agents made up of the salt of an oxyalkylated alkylene polyamine with a commercially available alkyl benzene sulfonic acid make excellent toxicant emulsions which are surprisingly effective over a much wider range of water hardness than has heretofore been possible.

The oxyalkylated polyamine component of the salt is one of the type formed by reacting an alkylene polyamine containing from 2 to 8 carbon atoms, and selected from the group consisting of ethylene diamine, diethylene triamine, triethylene tetramine, tetraethyl pentamine and propylene diamine, with a $C_2$–$C_4$ alkylene oxide selected from the group consisting of ethylene oxide, propylene oxide and butylene oxide in the proportion of from two to three moles of the oxide for each mole of the polyamine. The products so formed, which can also be prepared by other conventional means, if desired, have a total of from two to three hydroxyalkyl groups each containing from two to four carbon atoms. For example, when ethylene diamine or diethylene triamine are reacted with from two to three moles of an alkylene oxide, products of the following general structure may be obtained:

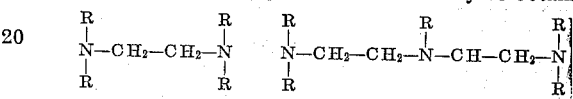

where from two to three of the R's represent $C_2$–$C_4$ hydroxyalkyl groups and where the balance of the R's are hydrogen atoms. The above structures are typical of those which are formed by reacting an alkylene oxide with an alkylene polyamine.

In the preferred practice of this invention, the alkyene polyamine employed is selected from the group consisting of ethylene diamine and diethylene triamine, while the preferred oxyalkylating agent is propylene oxide.

The alkylbenzene sulfonic acid compound employed in forming the salt is one of the type commercially available for use in detergent formulations, the alkyl substituent group on the benzene containing from 8 to 18 carbon atoms. Representative alkyl groups, which may be branched or straight chain, are octyl, nonyl, dodecyl, tridecyl, hexacetyl and octodecyl. Preferred compounds are those wherein the alkyl group contains from 12 to 14 carbon atoms, as represented, for example, by dodecyl- and tridecylbenzene sulfonic acid.

The emulsifier hereof is formed from the oxyalkylated polyamine and the alkylbenzene sulfonic acid components by conventional methods adapted to provide the neutral salt. Methods of this character are fully set forth in Examples II, IV, VI and VIII, as given below.

The anionic emulsifiers of this invention are neutral salts having the following structural formula:

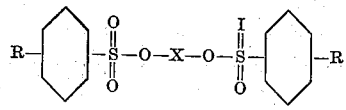

where the R's represent alkyl groups of from 8 to 18 carbon atoms each and X is a bifunctional ammonium radical containing from 2 to 8 carbon atoms derived by oxyalkylation of ethylene diamine, diethylene triamine, triethylene tetramine, tetraethylene pentamine or propylene diamine with from 2 to 3 moles of ethylene oxide, propylene oxide or butylene oxide. A typical salt, formed by neutralizing dodecylbenzene sulfonic acid with N,N'-dihydroxypropylethylene diamine, has the following structure:

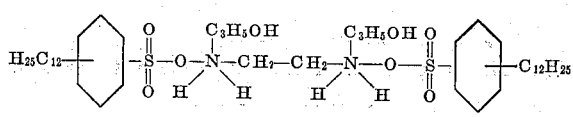

The new emulsifiers of the type described above when used in combination with non-ionic emulsifiers and a toxicant and an organic solvent give clear, concentrated toxicant solutions which will not separate on storage. The nonionic emulsifiers employed are those which are common in the trade, many products of this character being set forth herein in the examples. These mixtures, or solutions, are free of water, thus making for great stability on the part of the toxicants themselves. This is attributable to the fact that in neutralizing the sulfonic acid, no water is formed as a product of neutralization, with the result that the mixture is anhydrous. The presence of even traces of water has been found to affect the stability and shelf life of many toxicants, particularly DDT and other chlorinated derivatives.

On dilution with water these emulsifier-toxicant mixtures give instantaneous fine dispersion, or bloom, and form emulsions which are highly stable even after long standing. Furthermore, the resulting emulsions remain stable upon redispersion in the event any settling occurs after long standing or for other reasons. The emulsions give a low degree of foam when spraying or handling, a quality which also increases their effectiveness.

EXAMPLE I.—ETHYLENE DIAMINE PLUS 2 MOLS PROPYLENE OXIDE 660 grams anhydrous ethylene diamine was charged to a pressure reactor (11 mols) at 14° C., purged for one minute with dry nitrogen gas. 1276 grams (22 mols) of propylene oxide was added slowly from a pressure scale tank, after first raising the temperature of the steam-jacketed reactor to 142° C. Total time for the addition was 24 minutes, maximum temperature reached was 186° C. and maximum pressure 125 pounds per square inch. At end of reaction pressure dropped to 25 p.s.i. Product was cooled to 65° C. and unloaded. A yield of 1851 grams (95.6% of theory) of a water-white liquid which cooled to a soft paste was obtained, containing 2 mols propylene oxide per mol of ethylene diamine.

EXAMPLE II 243 grams of Socal No. 2, an aromatic xylene type solvent, was charged to a stainless steel beaker. 228 grams (1.3 mols) of the oxyalkylated amine from Example I was then added to the solvent with stirring. 659 grams (2.06 mols) of commercial dodecylbenzene sulfonic acid was added slowly, keeping the temperature between 45 and 50° C. by means of an ice bath. When all of the sulfonic acid had been added, the pH of a 1% solution of the mixture in 50% isopropanol was found to be 3.5. 10 grams additional Example I compound were required to bring the pH up to 4.6. The yield was 1140 grams of a clear pale amber liquid. Analysis by cationic titration showed the product to contain 71.5% active material (414 eq. wt.) which was the neutralization product of the oxyalkylated diamine and the sulfonic acid.

EXAMPLE III.—ETHYLENE DIAMINE PLUS 2 MOLS BUTYLENE OXIDE 540 grams (9 mols) anhydrous ethylene diamine was charged to the pressure reactor at 35° C. and then purged with dry nitrogen gas. 1296 grams (18 mols) of butylene oxide N (Union Carbide) was added slowly from a pressure scale tank after first raising temperature of reactor (steam-jacketed) to 157° C. Total time for addition was 14 minutes. Maximum temperature attained was 200° C., maximum pressure was 150 p.s.i. After reaction was complete (52 minutes after addition of butylene oxide completed) pressure was 25 p.s.i. and temperature 162° C. Product was cooled to 100° C. and unloaded. Product obtained was light colored paste containing the 2 mol addition product. Yield was 99.9% of theoretical.

EXAMPLE IV 70 grams of isopropanol and 102.05 grams (1 equivalent) of the oxyalkylated amine prepared in Example III was charged to a stainless steel beaker and agitated. 325 grams (1 equivalent) of a commercial dodecyl-benzene sulfonic acid was added slowly with agitation maintaining temperature between 45 and 50° C. by means of an ice bath. When all of the sulfonic acid had been added, the pH of a 1% solution in 50% isopropanol was found to be 3.2. Additional amine from Example III was added until the pH was raised to 5.2. This took 34.45 grams. The yield was 531.5 grams of a clear amber liquid containing 86.83% of di(hydroxybutyl) ethylene diamine disulfonate.

EXAMPLE V

In this operation, 927 grams anhydrous diethylene triamine were charged to the pressure reactor at 15° C. and purged with dry nitrogen gas for two minutes. Temperature was raised to 150° C. using steam in the reactor's coil and jacket. 1044 grams of propylene oxide were slowly added to the reactor with agitator on. After 16 minutes the addition was complete, temperature was 185° C. and pressure 100 p.s.i. In 14 minutes more, reaction was complete, temperature was 165° C. and pressure 72 p.s.i. Product was cooled to 110° C. and unloaded. Yield was 99.5% of theoretical. Product was a soft paste. This reaction proceeded, in the main, in accordance with the following equation:

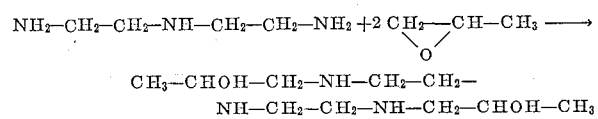

$$CH_3-CHOH-CH_2-NH-CH_2-CH_2-$$
$$NH-CH_2-CH_2-NH-CH_2-CHOH-CH_3$$

EXAMPLE VI 70 grams of isopropanol was charged to a stainless steel vessel. 109.5 grams (1 equivalent) of the oxyalkylated amine from Example V was added to the isopropanol with stirring. 325 grams (1 equivalent) of a commercial dodecylbenzene sulfonic acid was added slowly with stirring to the amine-solvent mixture. The temperature was maintained between 45–50° C. with the aid of an ice bath. When all of the sulfonic acid had been added, the pH of a 1% solution of the mixture in 50% isopropanol was found to be 3.5. Additional small amounts of amine were added to adjust the pH of the product to between 4 and 7. 15 additional grams of amine being required to raise the pH to 5.3. The yield was 519.5 grams of a clear, amber liquid containing 86.5% of di(hydroxypropyl) diethylene triamine di-dodecylbenzenesulfonate. It may here be noted that diethylene triamine is considered a bifunctional amine for the purposes of these compounds since at the pH's used for toxicant concentrates, 5 to 7, only the terminal primary amino groups are functional in forming salts.

EXAMPLE VII

The following example illustrates the use of the ethylene diamine-2 mols propylene oxide adduct salt of dodecylbenzene sulfonic acid in a 4 pound chlordane per gallon emulsifiable concentrate. Two Formulas A and B were prepared.

*Emulsifiable concentrate*

| Formula A: | Percent |
|---|---|
| Chlordane | 45 |
| Kerosene | 50 |
| Emulsifier (based on Ca) | 5 |
| Formula B: | |
| Chlordane | 45 |
| Kerosene | 50 |
| Emulsifier (present invention) | 5 |

In each of the above formulations, 50% of the emulsifier component was made up of the following solution of conventional emulsifier wherein all except the isopropyl amine sulfonate (anionic) are nonionic in character:

| | Percent |
|---|---|
| Isopropyl amine sulfonate | 5 |
| Dodecylphenol-ethylene oxide adduct | 6 |
| Propylene oxide-ethylene oxide adduct | 27 |
| Ethoxylated nonylphenol | 6 |
| Polyoxyethylated mixed fatty and cyclic acids | 5 |
| Xylene, balance. | |

In Formula A the balance of the emulsifier was made up of calcium dodecylbenzene sulfonate, while in Formula B the balance of the emulsifier was made up of the propylene oxide (2 mols)—ethylene diamine (1 mol) adduct salt of dodecylbenzene sulfonic acid (Example II).

Formulas A and B were evaluated in tests wherein 5 ml. of the emulsifiable concentrate was added to 95 ml. of hard water (342 p.p.m.) in one case and to 95 ml. of soft water (34 p.p.m.) in the other, as contained in stoppered graduated cylinders. At this point observations were recorded as to the nature of the "bloom." Each cylinder was then up-ended 20 times, after which the resulting emulsions were observed first to determine their initial characteristics and then their stability at intervals over a 20-hour period. Lastly, at the end of the 20-hour observation period the emulsions were redispersed by mild shaking of the cylinder, following which note was made of the redispersal characteristics of each system and of its foaming qualities. The results of all these tests are reported in Table I below, the symbol "S" being employed in said table to designate the highest (and usually the only commercially acceptable) rating, followed in descending order of performance characteristics by E, G, and F. A creaming tendency, represented by the indicated number of milliliters of "CR" formed, represents same period, the product of the invention showed only a trace of creaming and no oil separation. After 20 hours, the calcium salt had separated 4 ml. of oil, while the inventive product showed only 2 ml. of cream. After redispersion, the calcium salt emulsion showed poor stability and separated immediately. The product of the invention showed excellent stability on redispersion.

EXAMPLE VIII

In this operation 208 g. (1.18 mols) of the ethylene diamine—2 mols propylene oxide adduct of Example I was dissolved in 138 g. of isopropanol. To the solution was then slowly added commercial dodecylbenzene sulfonic acid, the temperature being controlled at 45–50° C. by use of an ice bath. The pH of the solution was then adjusted to 4.8 by addition of 20 g. of the amine-propylene oxide adduct, and to this solution was added 73 g. of isopropanol. The resulting product, which was a clear, flowable amber liquid, was found by cationic titration to contain 75% of active material (414 eq. wt.).

The product prepared as described above was then used to prepare an emulsifiable toxicant concentrate which was then tested in hard and soft waters much as described in the preceding example. The performance of this material is recorded in Table II below along with that of other compositions which varied only in the amine, amine-alkylene oxide adduct or metal used to neutralize the sulfonic acid. Specifically, all these compositions, apart from the dodecylbenzene sulfonic acid salt components recited in Table II, were prepared as follows:

22.0 g. of the above or other dodecylbenzene sulfonate salt
12.1 g. DDT
36.4 g. naphtha solvent
5.0 g. isopropanol

TABLE I

| Formula | Bloom rating | Init. emul. rating | Ml. Cream | | | | Redisp. rating | Init. foam after agit. |
|---|---|---|---|---|---|---|---|---|
| | | | 5 min. | 15 min. | 1 hr. | 20 hrs. | | |
| (A) Hard | S | E | 0 | 0 | {1 cr. / 1 oil | 4 oil | S | Nil. |
| (A) Soft | E | G | tr. cr. | 2 cr. | 4 cr. | 7 cr. | E | Slight. |
| (B) Hard | S | S | 0 | 0 | tr. cr. | 2 cr. | S | Nil. |
| (B) Soft | E | G | 0 | 0 | 1 cr. | 9 cr. | S | Nil. | an undesirable, transitionary state between a stable emulsion and one which has broken down at least in part to water and oil. The formation of oil is indicated as such.

The above results clearly demonstrate that toxicant formula B, which contained the 2 mol propylene oxide, ethylene-diamine adduct salt of dodecylbenzene sulfonic acid in both hard and soft water, was comparable or superior to the calcium salt in every particular. For example in water of 342 p.p.m. hardness the bloom was the same, and in the initial emulsification the product of the invention was slightly better. After 1 hour, the calcium salt began to cream, and oil began to separate. After the 22.5 g. of a mixture of emulsifiers prepared as follows:

22.0 g. mixed mono-and diisopropyl amine sulfonates
1.5 g. methoxy-polyoxyethylene-polyoxypropylene glycol
15.0 g. nonylphenol-polyoxyethylene glycol
150.0 g. castor oil polyoxyethylene glycol
9.0 g. aromatic solvent 5 ml. of the foregoing concentrate was then added to 95 ml. of hard water (229 p.p.m.) and in some cases to soft water (34 p.p.m.), following which tests were made

TABLE II

| Amine or Metal Used to Neutralize the Sulfonic Acid | Water Hardness in p.p.m. | Init. Bloom | Init. Emul. | Ml. Cream | | | | Redispersion | Foam, Ml. |
|---|---|---|---|---|---|---|---|---|---|
| | | | | 5 min. | 15 min. | 1 hr. | 20 hrs. | | |
| Calcium (as calcium dodecyl benzene sulfonate). | 229 | S | S | 0 | 0 | 0 | 3 cr | S | 5. |
| Do | 34 | S | S | 0 | 0 | 0 | 1+ cr | S | 10. |
| Ethylene diamine + dodecyl benzene sulfonate-no alkylene oxide. | 229 | F | G | 2 cr | 5 cr | 6 cr | 6 cr | E | 10. |
| Ethylene diamine + 1 ethylene oxide. | 229 | F | G | 0 | 1½ cr | 5 cr | 8 cr | F | 4. |
| * * * * * | | | | | | | | | |
| Ethylene diamine + 2 ethylene oxides. | 229 | S+ | S | 0 | 0 | 1 cr | 1 cr / 1 oil | S | 8. |
| Ethylene diamine + 2 propylene oxides. | 229 | S | S | 0 | 0 | 0 | 0 | | Nil. |
| Do | 34 | S | S | 0 | 0 | 0 | 7 cr | S | Nil. |
| Ethylene diamine + 3 propylene oxides. | 229 | S | S | 0 | 0 | 0 | 3 cr | S | Nil. |
| Do | 34 | S | E | 0 | 1 cr | 3 cr | 6 cr | S | 7. |
| Ethylene diamine + 2 butylene oxides. | 229 | S | S | 0 | 0 | 0 | 2 cr | S | 1. |
| Do | 34 | S | S | 0 | 0 | 0 | 2 cr | S | 2. |
| Diethylene triamine + 2 propylene oxides. | 229 | S | S | 0 | 0 | tr. cr | 1 cr | S | Nil. |
| Do | 34 | S | S | 0 | 0 | tr. cr | 3 cr | S | Nil. |
| Diethylene triamine + 3 propylene oxides. | 229 | S | S | 0 | 0 | 0 | 0 | S | Slight. |
| Do | 34 | S | E | 0 | tr. cr | 2½ cr | 2 cr | S | Do. | and observations recorded all as outlined above in Example VII.

As shown in the above table, the products based on the emulsifiers of this invention, wherein the polyamine portion of the molecule is substituted with from 2 to 3 hydroxyalkyl groups, gave results which were essentially equal or superior to those obtained using the corresponding calcium sulfonate salts. On the other hand, those polyamine sulfonates which either contained no hydroxyalkyl or but one such group attached to the polyamine portion of the molecule, gave completely unsatisfactory results. Thus, the compounds formed from the non-oxyalkylated ethylene diamine and from ethylene diamine substituted with but a single hydroxyethyl group exhibited poor bloom and initial emulsion characteristics. Moreover, they rapidly developed cream and oil and had relatively poor redispersal qualities. Other work, here unreported, shows that the optimum qualities of the present emulsifiers also tend to fall off rapidly as the polyamine portion of the sulfonate salt is substituted with more than 3 hydroxyalkyl groups, the salt formed from tetrahydroxyethyl-ethylene diamine, for example, having poor initial emulsion characteristics and developing 4 ml. of cream after but 15 minutes time.

Toxicant compositions or concentrates, adapted to readily form an emulsion upon the addition of water, are formed by the incorporation of the desired toxicant with the emulsifier compositions whether the toxicant be an insecticide, herbicide, plant hormone, fungicide, or the like. Such toxicant compositions advantageously contain one or more toxicants, the emulsifier proper, and an organic solvent or mixture of solvents, with or without various supplemental agents, so that all that it is necessary for the ultimate user to do is to disperse the composition in the requisite amount of water and spray or otherwise apply it to the surface to be treated. The proportions of toxicant used in such toxicant compositions are variable within wide limits although, in the usual case, the toxicant in the concentrate will range from about 20% to about 50%. The amount of organic solvent will, in general, range from about 30% to 60%, and the emulsifier composition will usually be present in proportions of about 5% to about 10%. The organic solvent or mixtures may be selected from a large group, typical examples of which are kerosene, 2-methyl-pentanediol-1,2, benzene, toluene, polymethyl naphthalenes, pine oil, and the like. The dilution with water to form the emulsions for spraying or the like may vary within wide limits so that, for example, ultimate emulsions may be made containing from a fraction of one percent to several percent, for instance, 5%, of the toxicant or mixture of toxicants.

I claim:
1. An oil soluble anionic emulsifier made up of the neutral salt of a $C_8$–$C_{18}$ alkyl-substituted benzene sulfonic acid and a polyamine compound selected from the group consisting of ethylene diamine, diethylene triamine, triethylene tetramine, tetraethylene pentamine and propylene diamine, wherein a total of from 2 to 3 $C_2$–$C_4$ hydroxyalkyl groups are attached to the nitrogen atoms of said polyamine.
2. An oil soluble anionic emulsifier made up of the neutral salt of dodecylbenzene sulfonic acid and a compound of ethylene diamine wherein a total of from two to three $C_2$–$C_4$ hydroxy alkyl groups are attached to the nitrogen atoms of said diamine.
3. An oil soluble anionic emulsifier made up of the neutral salt of dodecylbenzene sulfonic acid and a compound of diethylene triamine wherein a total of from two to three $C_2$–$C_4$ hydroxy alkyl groups are attached to the nitrogen atoms of said triamine.

References Cited by the Examiner
UNITED STATES PATENTS 2,262,738  11/1941  De Groote _____ 260—584 X
2,270,681   1/1942  De Groote _____ 260—501
2,778,814   1/1957  Behrens et al. _____ 260—501

LORRAINE A. WEINBERGER, *Primary Examiner.*

B. M. EISEN, MARY B. WEBSTER,
*Assistant Examiners.*